United States Patent [19]
Marrow

[11] Patent Number: 5,938,790
[45] Date of Patent: Aug. 17, 1999

[54] SEQUENCE ERROR EVENT DETECTION AND CORRECTION USING FIXED BLOCK DIGITAL SUM CODES

[75] Inventor: Marcus Marrow, Malahide, Ireland

[73] Assignee: Silicon Systems Research Ltd., Dublin, Ireland

[21] Appl. No.: 08/812,993

[22] Filed: Mar. 4, 1997

[51] Int. Cl.⁶ .......................... H03M 13/00; G11B 20/18
[52] U.S. Cl. .............................. 714/795; 360/40; 360/53; 375/341; 714/824
[58] Field of Search .................................. 371/43.7, 43.6; 714/795, 824; 360/48, 53, 40; 375/341

[56] References Cited

U.S. PATENT DOCUMENTS

| | | | |
|---|---|---|---|
| 4,571,734 | 2/1986 | Dolivo et al. | 375/18 |
| 4,677,624 | 6/1987 | Betts et al. | 371/43 |
| 4,862,464 | 8/1989 | Betts et al. | 371/43 |
| 4,884,272 | 11/1989 | McConnell | 371/43 |
| 4,888,799 | 12/1989 | Karabed et al. | 371/43 |
| 5,134,635 | 7/1992 | Hong et al. | 375/94 |
| 5,233,630 | 8/1993 | Wolf | 375/67 |
| 5,257,272 | 10/1993 | Fredrickson | 371/43 |
| 5,280,489 | 1/1994 | Fredrickson et al. | 371/45 |
| 5,291,499 | 3/1994 | Behrens et al. | 371/43 |
| 5,327,440 | 7/1994 | Fredrickson et al. | 371/43 |
| 5,341,387 | 8/1994 | Nguyen | 371/45 |
| 5,377,133 | 12/1994 | Riggle et al. | 364/736 |
| 5,379,306 | 1/1995 | Noma et al. | 371/43 |
| 5,414,737 | 5/1995 | Uesugi et al. | 375/340 |
| 5,430,744 | 7/1995 | Fettweis et al. | 371/43 |
| 5,434,886 | 7/1995 | Kazawa et al. | 375/262 |
| 5,457,705 | 10/1995 | Todoroki | 371/43 |
| 5,485,472 | 1/1996 | Fredrickson | 371/43 |
| 5,488,633 | 1/1996 | Laroia | 375/262 |
| 5,490,178 | 2/1996 | Blaker et al. | 375/341 |
| 5,497,384 | 3/1996 | Fredrickson et al. | 371/43 |
| 5,511,080 | 4/1996 | Itoi et al. | 371/43 |
| 5,521,945 | 5/1996 | Knudson | 375/341 |
| 5,530,707 | 6/1996 | Lin | 371/43 |
| 5,537,424 | 7/1996 | Karabed et al. | 371/43 |
| 5,541,955 | 7/1996 | Jacobsmeyer | 375/222 |
| 5,548,600 | 8/1996 | Fredrickson et al. | 371/43 |
| 5,844,741 | 12/1998 | Yamawaka et al. | 360/65 |

OTHER PUBLICATIONS

Shung, Bernard C, et al, "A 30–MHZ Trellis Codec Chip for Partial–Response Channels", *I.E.E.E. Journal of Solid–State Circuits*, Dec. 1991, vol. 26, Issue 12.

Karabed, Razmik, et al, "Matched Spectral–Null Codes for Partial–Response Channels", *I.E.E.E. Transactions on Information Theory*, May 1991, vol. 37, Issue 3.

Knudson, Kelly J., et al, "A Concentrated Decoding Scheme for (1–D) Partial Response with Matched Spectral–Null Coding", *I.E.E.E. Global Telecommunications Conference*, 1993 vol. 3.

Wood, "Turbo–PRML: A Compromise EPRML Detector", *IEEE Transactions on Magnetics*, vol. 29, No. 6, Nov. 1993, pp. 4018–4020.

Knudson et al., "A Concatenated Decoding Scheme for (1–D) Partial Response with Matched Spectral–Null Coding", GLOBECOM '93: IEEE Global Telecommunications Conf., pp. 1960–1964, Dec. 1993.

Nishiya et al., "PERD Partial Error Response Detection", *IEEE Transactions on Magnetics*, vol. 31, No. 6, Nov. 1995, pp. 3042–3044.

Yamakawa et al., "SPERD: Simplified Partial Error Response Detection", 1995 Digest of INTERMAG '95: IEEE International Magnetics Conf., Dec. 1995.

*Primary Examiner*—Stephen M. Baker
*Attorney, Agent, or Firm*—Richard K. Robinson

[57] ABSTRACT

A data receiving channel has a signal converter that converts a received signal into a digital signal. The digital signal is then applied to a Viterbi detector that will provide, as an output, a stream of digital signals that have a maximum likelihood of being accurate. Error correction is performed at the bit level through calculation of the error between the received signal and the maximum likelihood estimate signal produced by the Viterbi detector.

21 Claims, 5 Drawing Sheets

SEQUENCE ERROR EVENT DETECTION AND CORRECTION USING FIXED BLOCK DIGITAL SUM CODES

BACKGROUND OF THE INVENTION

This invention relates to a method and apparatus for transmitting binary digital data over partial-response channels. More particularly, it relates to a method and apparatus for improving the performance of a partial-response maximum likelihood detector through the use of fixed Block Digital Sums (BDS) codes.

The use of Partial-Response-Maximum-Likelihood signaling, hereinafter referred to as "PRML," is well known in the art as a means of ensuring accurate data transmission. There is, however, continuous work being done to improve the accuracy of data communication channels. For example, U.S. Pat. No. 5,414,737 discloses a data decoding device which eliminates the need for encoding by a decoder for estimating an error rate and can estimate, based on a discriminator output, the error rate at a high precision even if an error is included in the discriminator output. A square error sum is calculated by an error calculator based on an output of an equalizer. An estimated error rate is determined based on the error sum, a likelihood is determined based on the estimate error rate and soft discrimination decoding is made based on the likelihood and the output of the equalizer.

Similarly, as compressed digital television evolves, the need for being able to detect and correct errors becomes more important. An example of the application of Viterbi PRML decoders to perform such functions in digital television is disclosed in U.S. Pat. No. 5,497,401.

The continually expanding market for personal computers, in both home applications and business applications, has increased the demand for program and data storage capacities. This demand is being met by hard disc manufacturers who store the data onto magnetic films deposited on rotating hard discs. PRML signaling is used in the read channel for these hard discs. An example of such a system is disclosed in U.S. Pat. No. 5,341,387 wherein a Viterbi detector for a PR4, ML data channel includes a data sample input for receiving digital data samples from a source. Digital data samples are taken of data which has been coded in a predetermined data code format and which has been passed through a data degrading channel. A delay circuit delays the digital data samples received at the data sample input. A data selector controls an output of the delayed circuits in accordance with a feedback control bit value. An adder circuit combines data samples from the data sample input with delayed samples from a delayed circuit to produce a sum. A threshold input receives programmable positive and negative data threshold values. A threshold selector puts out either the positive or negative threshold value in accordance with a sign bit control value. A comparator compares the sum with a selected threshold value and puts out a logical value based upon comparison thereof. It includes Viterbi decision state logic for determining the sign bit control value, the feedback control bit value, and two wrong data bits for each incoming data sample. A memory path circuit decodes a sequence of consecutive values of the wrong data bits in accordance with a predetermined maximum likelihood trellis decode logic table related to the predetermined data code format and puts out a sequence of detected coded bits.

An example of the search for an optimum Viterbi detector is provided in U.S. Pat. No. 5,485,472 in which there was disclosed a method for constructing trellis codes and an apparatus for providing trellis codes with increased minimum distance between output sequences of partial-response channels with constrained inputs. A Viterbi detector expands a conventional trellis structure for the channel incorporating additional states interconnected such that a pre-selected function associates each state in the trellis with an algebraic evaluation of a polynomial at a particular element of a finite field. The detector trellis is time varying such that only certain values of the pre-selected function are allowed every M bits. The time varying assures that there are no minimum distance extensions of erroneous sequences beyond a predetermined length in the trellis. Reliability of storage channels is desirably increased because more noise is required to overcome the additional distance and cause an error in distinguishing the correct encoded sequence.

The system above, however, can be unduly complex, especially for high rate codes and channels with large memory length. It is thus desirable to reduce the complexity of the detector at a modest expense to performance.

SUMMARY OF THE INVENTION

A data receiving channel has a signal converter that converts a received signal into a digital signal. The digital signal is then applied to a Viterbi detector that provides, as an output, a stream of digital signals with a maximum likelihood of being accurate. Additionally, error correction is performed at the bit level through calculation of the error between the received signal and the expected received signal estimated by the Viterbi detector.

Error correction is provided at the codeword level through the use of fixed running digital sum code constraints in order to distinguish valid codes words.

In the event of a detected error the boundaries between codewords are checked to detect and to correct error events which span two different codewords.

It is an object of the invention to provide an error detection and correction circuit enhancing detector performance and with less circuitry than that required for a full trellis Viterbi detector.

DESCRIPTION OF THE FIGURES

FIG. 4 is a block diagram of a valid codeword detection circuit of FIG. 3;

FIG. 5 is a simplified block diagram of the FIR filter of FIG. 3;

DETAILED DESCRIPTION OF THE EMBODIMENTS

Figure 1:
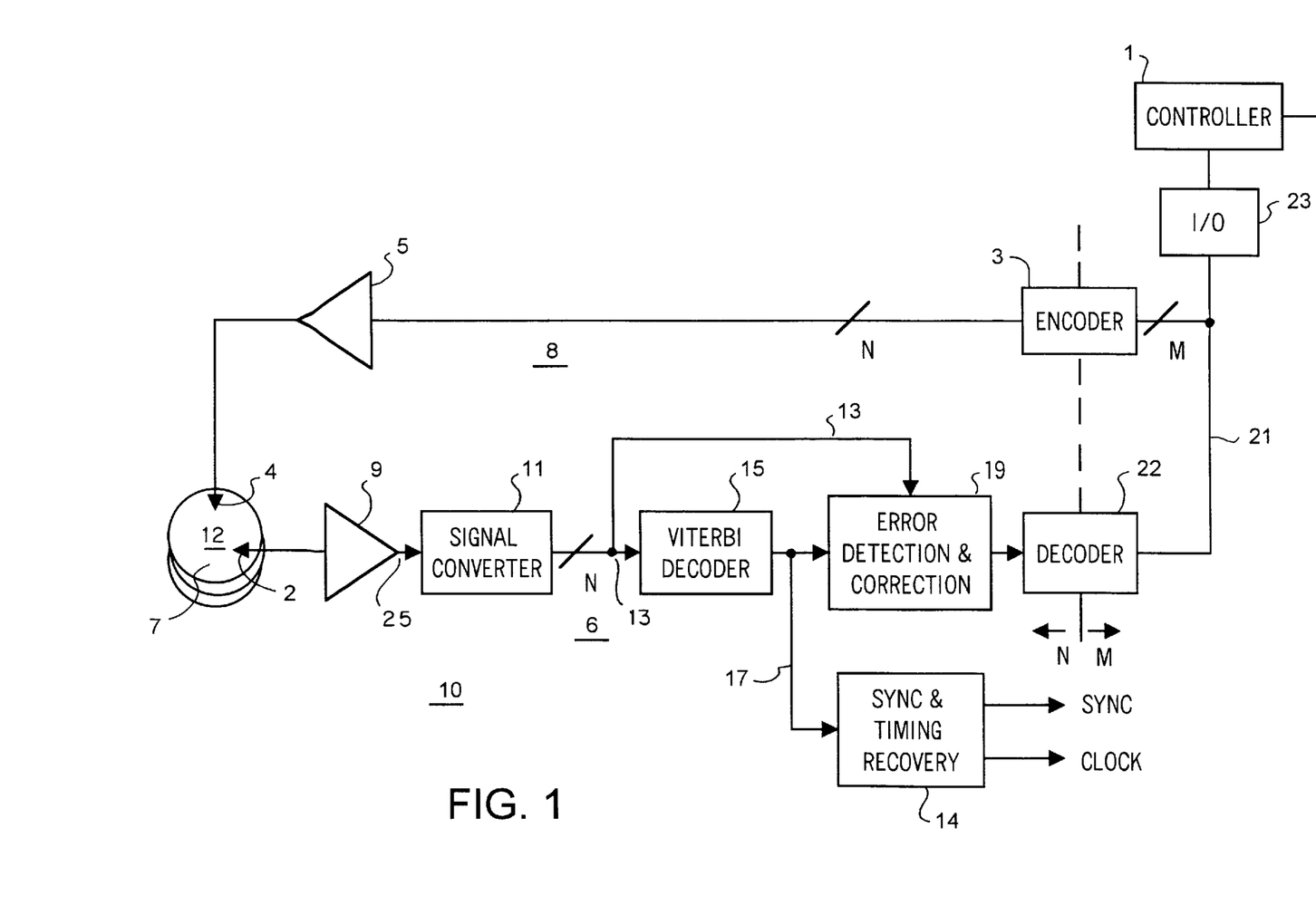
FIG. 1 is a block diagram of a read/write telecommunication channel according to the invention.

In FIG. 1, to which reference should now be made, there is shown a telecommunication system 10 having a write channel 8 and a read channel 6. The write channel 8 includes a data source, such as a computer, that provides a stream of digital data to an encoder 3 via controller 1. The encoder 3 blocks the data into codewords and codes the digital data provided from the data source into NRZ write data in a manner that assigns the same system characteristics to every codeword including a BDS or Block Digital Sum that is equal to a fixed number of logic ones in each codeword and is Run Length Limited (RLL) constrained. After the data is encoded by the encoder 3, it is applied to a head preamplifier 5 and then transmitted to a hard disc 12 where the codewords are stored.

In the case of FIG. 1, transmitting means one system which includes a write head 4 and the individual discs 7. The discs 7 are magnetic discs that are rotated at a high rate of speed on which data is written onto the magnetic surface by use of a write head 4 and retrieved from the magnetic surface of each of the discs 7 through the use of magnetic sensors 2. The signal that is sensed by the magnetic sensor 2 is amplified by a preamplifier 9 and applied to a signal converter 11.

The functions of the signal converter 11 are:

1. Digitalization of the analog signal provided from the preamplifier 9;
2. Timing recovery;
3. Gain recovery
4. Offset cancellation; and
5. Equalizing the signal applied thereto.

The output 13 of the signal converter 11 is applied to a PR4 Viterbi detector 15. The PR4 Viterbi detector 15 is, in actuality, a trellis-state-machine in which the output 13 from the signal converter 11 is applied to the PR4 Viterbi detector 15 in groups, in the case of this sample embodiment, a precision of M bits in the embodiment M=6. These 6-bits provide the input to the PR4 Viterbi detector 15.

There have been numerous articles and papers written on the optimum design of the PR4 Viterbi detector so that there are well defined allowed states and disallowed states. In response to the input data, the PR4 Viterbi detector will only select those states having a maximum likelihood of being the proper states such that the output on the conductor 17 represents the data having the highest log likelihood of being accurate based upon the input from the signal converter 11. U.S. Pat. No. 5,485,472, U.S. Pat. No. 5,341,387 and U.S. Pat. No. 5, 521,945 are examples of implementation of PR4 Viterbi detectors and are incorporated herein by reference.

The output of the PR4 Viterbi detector 15 is applied to an error detection and correction circuit 19 where, amongst other things, the output of the PR4 Viterbi detector on conductor 17 is passed through a target channel encoder within the error detection and correction circuit 19 and compared to the output of the signal converter 11 to ascertain the correctness of the maximum likelihood estimate provided on conductor 17 by the PR4 Viterbi detector 15. After the data is corrected in the error detection correction and circuit, 19 it is passed on to a decoder 22 and to an input/output section 23 via conductor 21. Timing is obtained by the sync detect and clock generation circuit 14 from the output of the PR4 Viterbi detector 15.

Figure 2:
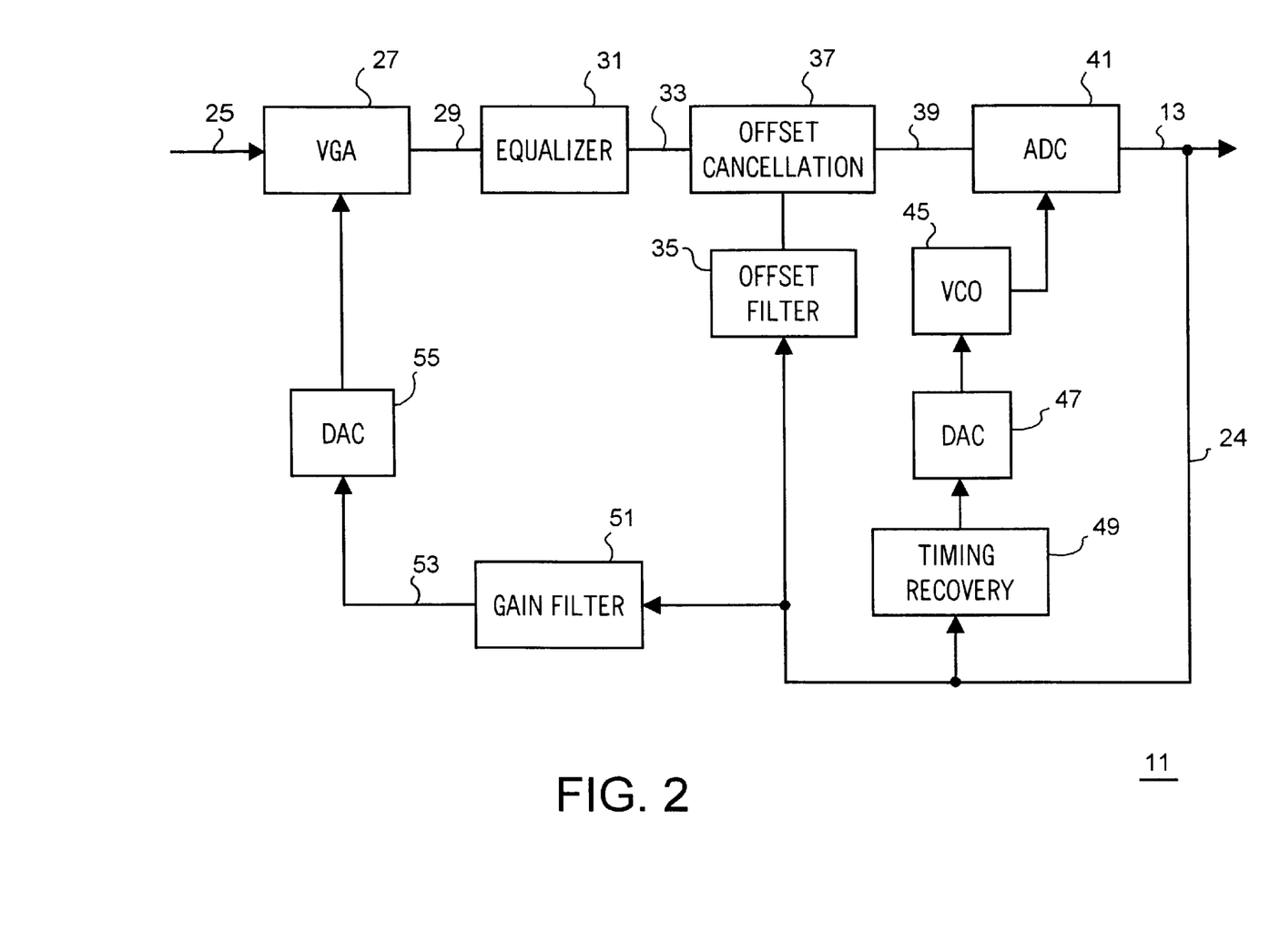
FIG. 2 is a block diagram of the signal converter of FIG. 1.

FIG. 2, to which reference should now be made, is a block diagram of the signal converter 11. The signal present on line 25 is either an amplified signal detected by the magnetic sensor 2 from the disc 7 or a down converted receive signal received by the front end of a telecommunication receiver such as a cellular telephone or a digital television receiver. The signal received by a Variable Gain Amplifier (VGA) 27 is a differential analog signal. The VGA 27 is controlled by a control signal provided by the Digital to Analog Converter (DAC) 55. The goal of the VGA 27 is to give the signal on conductor 25 a constant amplitude as it is applied to conductor 29.

The equalizer 31 provides the filtering necessary to adjust the signal to the target response such as a PR4 or EPR4 target signal. There is an offset cancellation circuit 37 which is connected to the output of the equalizer 31 via a conductor 33 where the offset is adjusted to a zero offset. The zero offset signal is conducted to an Analog to Digital Converter (ADC) 41 via conductor 39. In the case of hard disc drives, this is usually a 6-bit A/D converter. The output of the ADC 41 is provided on conductor 23 which also is connected to a gain filter 51. The gain filter 51 provides the six data bits to a Digital to Analog Converter (DAC) 55 which provides the gain control to the VGA 27. The signal on conductor 39 is assumed to be a constant amplitude with a zero offset. The sampling rate of the ADC 41 is at the symbol rate of the codeword and the input signal is sampled at once per bit or symbol.

The timing for the ADC 41 is provided via conductor 23 and a timing recovery circuit 49. The timing recovery circuit 49 may be a free running clock that is brought into sync with the incoming data or other techniques known in the art. The output of the timing recovery circuit 49 is applied to a Digital to Analog Converter (DAC) 47 which drives a Voltage Control Oscillator (VCO) 45. The VCO 45 provides a sampling signal to the ADC 41. The receive signal has a finite set of known amplitudes as the result of a given signal being passed through a known target response channel. By a target response we mean the D transform of the channel. A PR4 target response channel is classified by its D transform $(1-D)^2$ whereas an EPR4 target response channel is described by the input D transform of $(1-D)(1+D)^2$.

Figure 3:
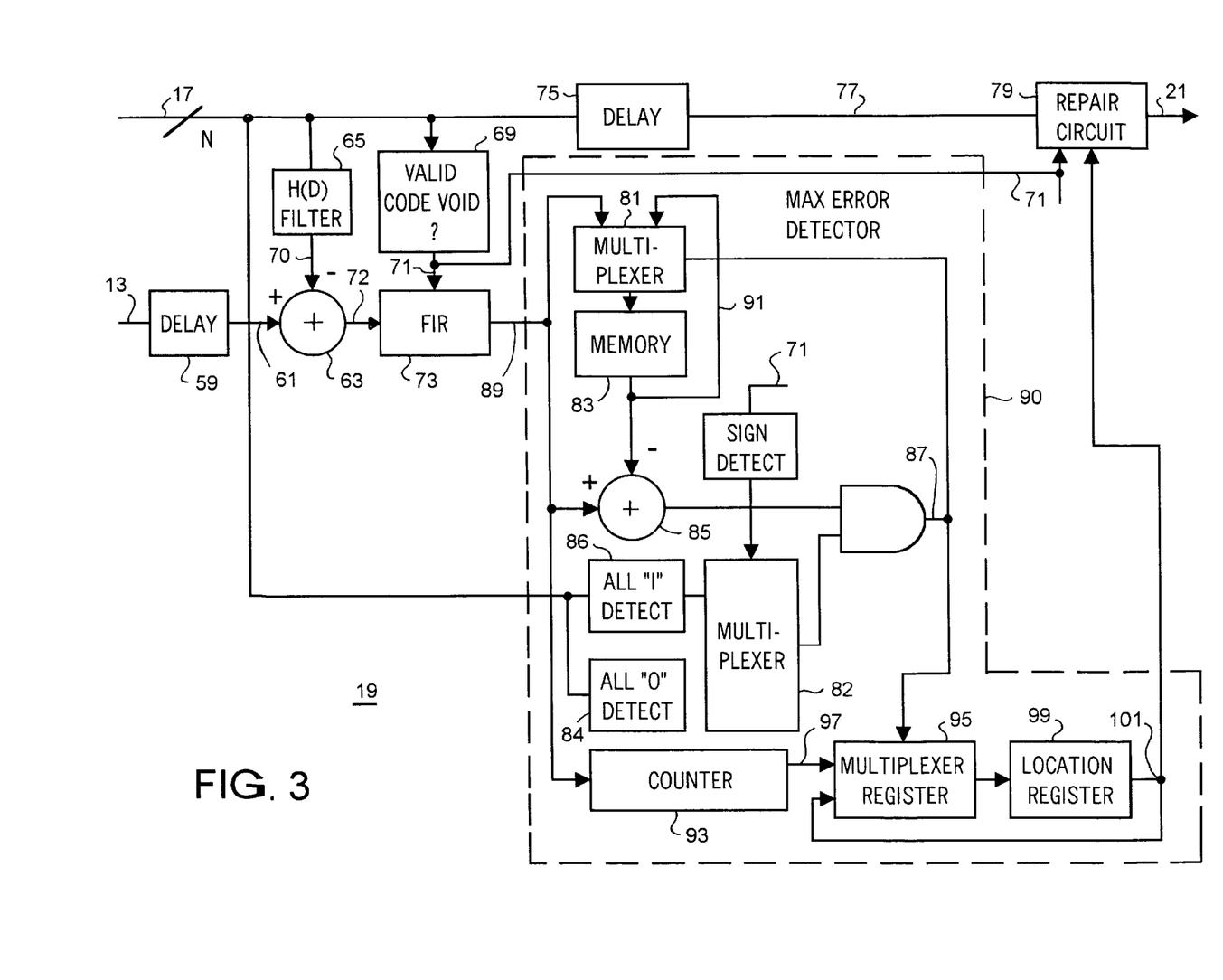
FIG. 3 is a block diagram of the error detection and correction circuit according to the invention.

FIG. 3 is a block diagram of the error detection and correction circuit 19 and should be utilized in conjunction with FIGS. 1 and 2 at this time. The output from the PR4 Viterbi detector 15 is conducted by a conductor 17 into the error detection and correction circuit 19. These bits are called tentative NRZ bits as they leave the PR4 Viterbi detector. They are the best estimates of the decoded bits. A valid codeword detector circuit 69 enables the max error detector 90 and the repair circuit 79 by indicating whether or not the codeword that is being detected is valid. The encoder 3 of FIG. 1 encodes each codeword such that it has a fixed number of logic ones in every codeword. The valid codeword detector 69 counts the number of logic ones in each codeword. If this number is correct, the codeword passes through to conductor 21 without any adjustments being made. This of course saves power as the error correction circuit is only enabled when an error on the RDS of the code word is detected. If an error is detected, the error detection and correction circuit 19 attempts to correct the bits that are in error. In the case of an invalid codeword, the signal M on conductor 71 enables the programmable FIR 73 which allows the signal on conductor 72 to pass through to conductor 89 into the maximum error detection circuit 90.

In the case of an invalid codeword, an attempt is made to determine which of the tentative NRZ bits of the PR4 Viterbi detector 15 are in error. This is done by passing the output of the PR4 Viterbi detector through an H(D) filter 65. The H(D) filter 65 transforms the data according to the characteristics of the target channel. In the case of the embodiment in FIG. 1, the target channel is a PR4 filter with a polynomial of $(1-D)^2$. The output of the H(D) filter 65 is the estimate of the output of the target channel. The output 13 of the signal converter 11, is also applied to a delay circuit 59 to compensate for the delay of the signal progression through the PR4 Viterbi detector 15 and the H(D)filter 65 and is applied to a comparator 63 which sums the delayed output of the signal converter 11 on conductor 61 with the output of the H(D) filter 65 present on conductor 70. The difference of the sum is applied to the programmable FIR filter 73 after which it is applied to the maximum error detector 90.

The valid codeword detector 69 has a primary function of counting the number of logic ones in a codeword to see if the codeword is correct or not, and secondly, if the codeword is incorrect a determination is made of how many logic ones are contained within the codeword and consequently, the amount that the checked codeword has deviated from a valid codeword. The deviation from the valid codeword is used to determine the length of the error event produced by the PR4 Viterbi detector 15.

The information on the number of ones is then fed to the programmable FIR filter 73 through which the errors are passed from the comparator 63. For any particular codeword having a length of N data bits, there are N samples provided to the PR4 Viterbi detector 15. The PR4 Viterbi detector 15 provides N single bits as an output and consequently, the output from the comparator 63 provides N error samples that are fed into the programmable FIR filter 73. The FIR filter 73 provides as an output, N filtered bits.

The next step is to determine the maximum error and its location in the codeword. This function is provided by the max error detector circuit 90. A comparator 85 compares the conductor 89 error from the programmable FIR filter 73 with a previous max error that is stored in a max error memory 83. If the max error stored in the max error memory 83 is less than the error from the programmable FIR filter 73, then the output of the comparator 85 will enable a Multiplexer 81 to store the output from a programmable FIR filter 73 in the max error memory 83. Otherwise, the data stored within the max error memory 83 is reloaded and maintained as a max error until a larger error is detected and provided by the programmable FIR filter 73.

The max error detector circuit 90 also provides the location of the max error within the received codeword. A counter 93 counts the number of error samples and applies that to a multiplexer and register 95 which is also enabled by the output of the comparator 85. The output of the multiplexer register 95 is stored in a location register 99 which provides its output to a repair circuit 79. The repair circuit 79 will repair the max error bit stored in the memory 83 when there is an indication of an invalid codeword from the valid codeword detector 69 provided to the repair circuit 79 via conductor 71 and its location is identified by the data stored in the location register 99.

Figures 4, 5, 7:
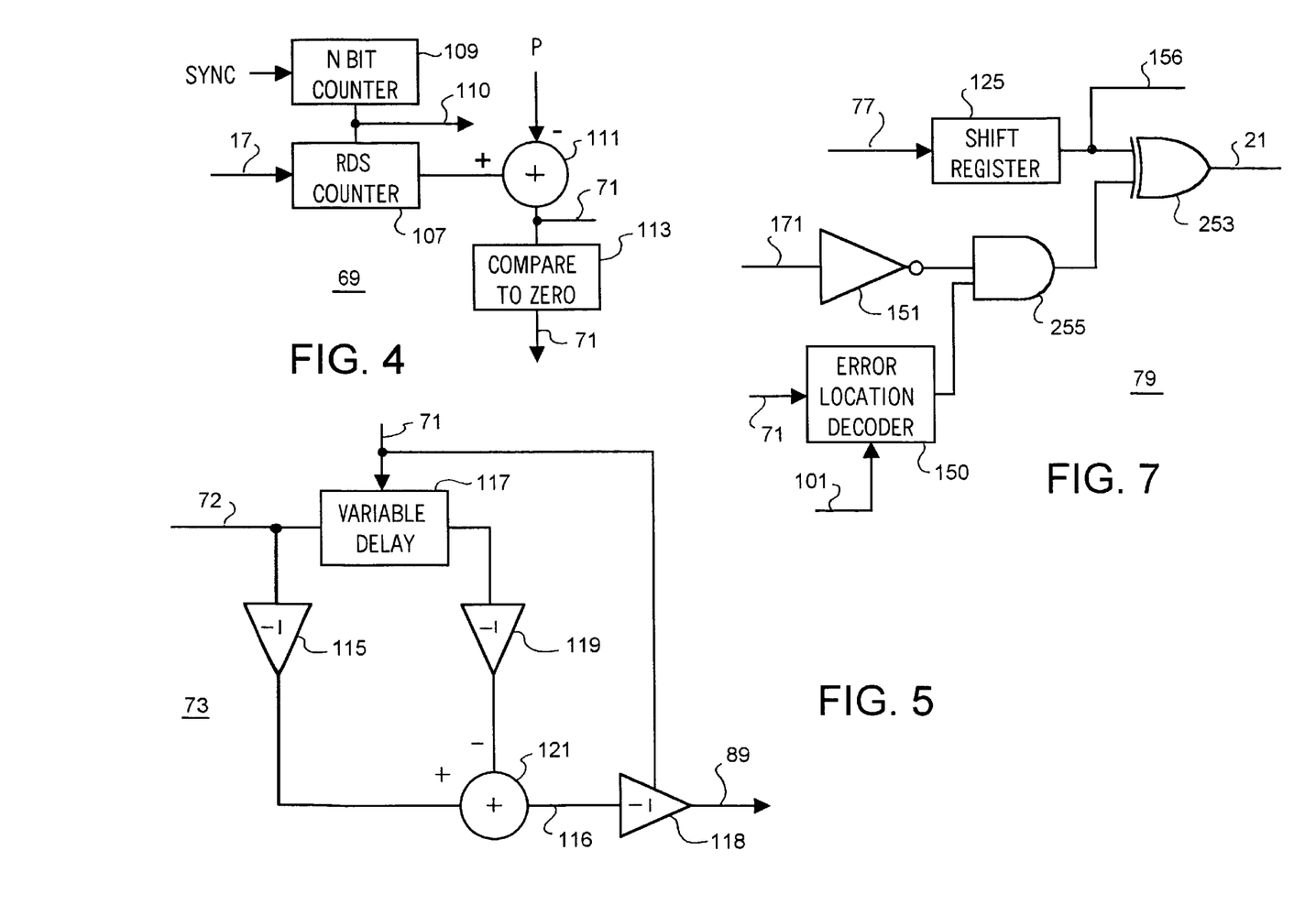

In FIG. 4, to which reference should now be made, there is a block diagram of the valid codeword detection circuit 69. The output for the PR4 Viterbi detector 15 is applied by line 17 to the input of the valid codeword detector 69, where it is applied to a Running Digital Sum (RDS) counter 107. The RDS counter 107 is reset at the beginning of each codeword by the N bit counter 109 that is in sync with the incoming signal from the PR4 Viterbi detector due to the action of a sync and timing recovery circuit 14 of FIG. 1. In the data that is transmitted there is provided a preamble which is a stream of digital bits having a predefined configuration followed by a second portion of the data stream that provides changes in logic states. The change in logic states is detected by the sync and timing recovery circuit 14 which syncs the valid codeword detect circuit to the incoming data stream by resetting the N-bit counter 109. The N-bit counter 109 counts the number of incoming bits and provides a reset signal at the end of every codeword. The reset signal is used to reset the RDS counter 107.

As explained earlier, it is expected that there will be produced an output from the PR4 Viterbi detector of N-bits for each codeword. The N-bit counter 109 sums the N-bits to provide a pulse at the end of each codeword to reset the RDS value accumulated by the RDS counter 107. The N-bit counter 109 is also in sync with the incoming data bits due to its connection to the sync and timing recovery circuit 14.

The value of logic ones at the end of each codeword is compared to a fixed value or bias labeled P by comparator 111. P is a block Digital sum where a block is the same length as a codeword. If the running Digital sum is not equal to P then there will be an invalid codeword signal provided by the comparator 111. The output 71 of the comparator 111 is applied to a zero circuit 113 which provides, on its output, an invalid code signal when the output of the comparator 111 indicates a non-zero difference between the received word and P. The output of the compared to zero circuit 113 is an enable signal that enables the repair circuit 79 only when the results of the comparator 111 is not equal to zero.

The FIR filter 73 of FIG. 5 is used for a dicode channel. The PR4 channel can be seen as a pair of interleaved dicode channels. In the embodiment of FIG. 5, the output from the comparator 63 is applied by conductor 72 to a variable delay 117. The variable delay 120 is programed by the difference signal from the valid codeword detect circuit 69. The error signal that is provided from the comparator 63 is also applied to a weighting coefficient of a "−1" circuit 115 whereas the output of the variable delay is applied to a "1" weighting coefficient circuit 119. The outputs of the two weighting coefficients are summed by a summing circuit 121 to provide, on conductor 89, the filtered output for application to a weighted inverter 118. The weighted inverter 118 is enabled by the signal provided on conductor 71.

Figure 6:
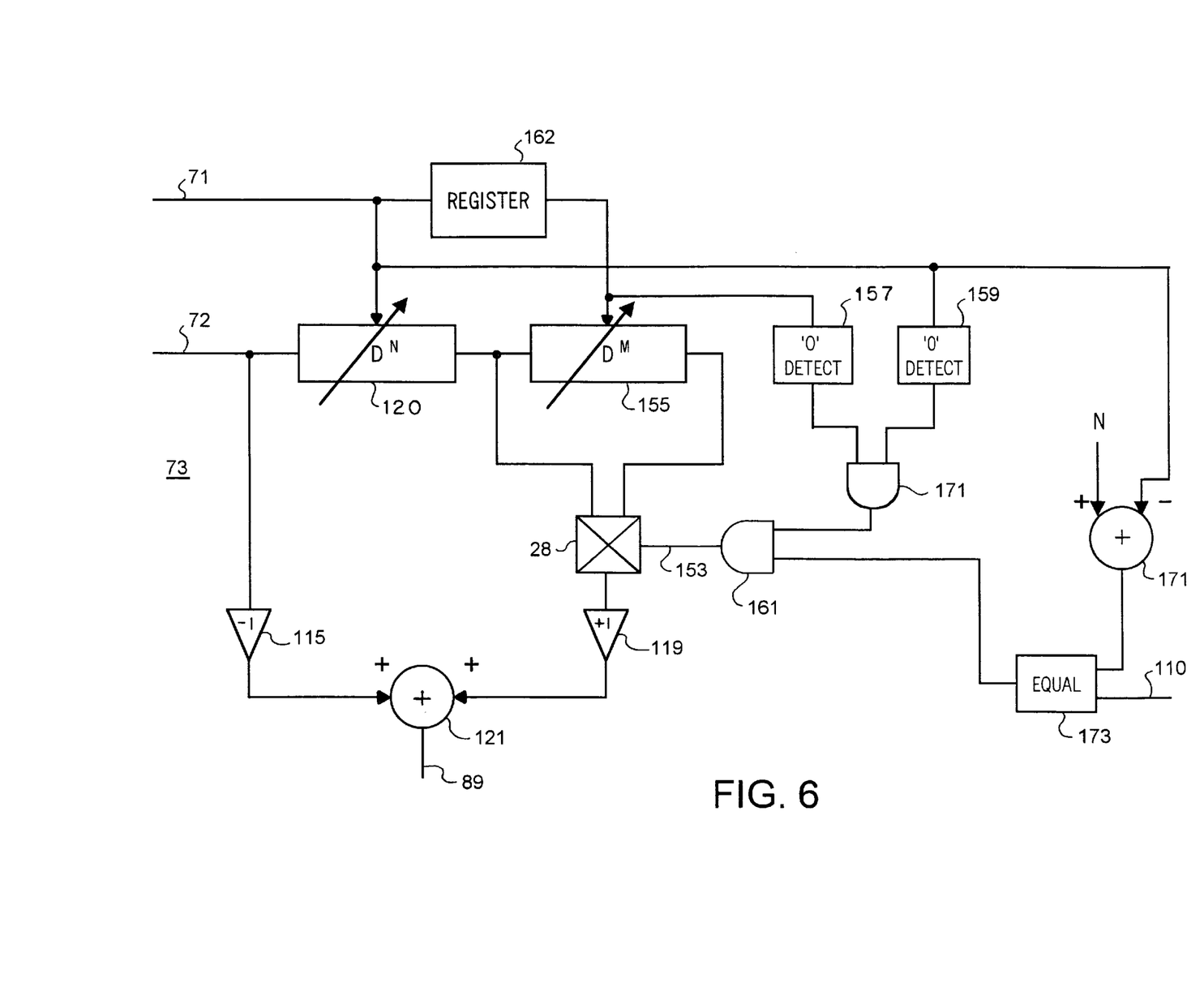
FIG. 6 is a block diagram of the boundary violation detection circuit according to the invention; and, FIG. 7 is a block diagram of the error correction circuit of FIGS. 4 and 7.

FIG. 6, to which reference should now be made, is a more complex embodiment of the FIR 73 and includes the circuitry required to correct errors which span two codewords. The valid codeword detection circuit's output on conductor 71 is applied to a register 162. The register 162 is clocked at the codeword rate, (or once every codeword). There are two zero detect circuits—zero detect circuit 157 and zero detect circuit 159. The zero detect circuit 159 is used for the current codeword that is being clocked into the register 162 and zero detect circuit 159 is used for the previous codeword stored within the register 162. The condition under which a boundary error-event is possible is when both the zero detect circuits 157 and 159 are false. This occurrence is detected by AND gates 161 and 171 with the signal on the output of AND gate 161 on conductor 153 being designated as the check boundary signal. Therefore, the effect of this circuit will place the requirement to check for boundary errors if both the outputs of the zero detect circuits 157 and 159 indicate that a signal other that logic zero has been detected. This is verified by the comparison of the N bit counter output 110 and the output of the comparator 171.

A check boundary circuit is used with one extra FIR calculation and subsequent comparison of the FIR output with the maximum error at the max error detect circuit 90. This is achieved by the addition of an M variable delay circuit 155 and multiplexing with multiplexer 28 the M variable delay circuit 155 with the output of the N variable delay circuit 120. When this occurs, it achieves the addition of the delay for the second codeword using the M variable delay 155 in conjunction with the multiplexer 28.

FIG. 7, to which reference should now be made, is a simplified logic diagram of the repair circuit 79. In the preferred embodiment there are parallel outputs provided by the shift register 125 wherefor the exclusive OR gating 253 is duplicated for each output.

The input to the register 125 is from the delay line 75. The BDS difference signal is applied to an AND gate 155 via inverter 51. The AND gate 255 compares the output of the error location decoder 150 with the inverted BDS difference signal to provide an enabling signal to the exclusive OR gate 253. The output of AND gate 255 is exclusively ORed with the output of shift register 125 to provide a corrected output signal on conductor 21. The error location decoder 150 is essentially a down-counter.

I claim:

1. A data receiving channel comprising:

a signal converter means for converting an input signal to a converted signal having predefined characteristics;

a Viterbi detector means for generating an output signal of data blocks with each data block having a predefined number of symbols from the converted signal;

error correction means for detecting and correcting errors in the data blocks, said error correction means including a target channel filter means for filtering the output signal with the predefined characteristics to provide a target channel signal that is an estimate of the converted signal, and a comparator means for providing an error signal from a comparison of the target channel signal and the converted signal.

2. The data receiving channel according to claim 1 wherein the error correction means further comprises:

maximum error detection means for detecting the number of symbols in an error event in the output signal from the error signal; and location detection means for detecting the location of the number of symbols in an error event in each data block from the error signal.

3. The data receiving channel according to claim 2 wherein the error correction means further comprising:

repair circuit means for repairing a symbol in error at the detected location in each data block.

4. The data receiving channel according to claim 1 wherein each data block includes at least one error check symbol that provides a predefined number of symbols representing a first logic state, the error correction mean further includes:

a valid block detection means for providing a second error signal representing an error in each data block of a number of symbols representing the first logic state.

5. The data receiving channel according to claim 4 wherein the error correction means further includes:

combining means for combining the error signal with the second error signal to provide a max error signal from the combination of the error signal with the max error signal;

maximum error detection means for detecting the number of symbols in error in each data block from the max error signal; and location detection means for detecting the location of the symbols in error in each data block from the max error signal.

6. The data receiving channel according to claim 5 further comprising:

repair circuit means for repairing each symbol in error at the detected location in each data block in the output signal.

7. The data recovery channel according to claim 5 further comprising:

boundary error detection means for detecting errors at a boundary between a first data block and a data second block.

8. A method of receiving data comprising:

converting an input signal to a converted signal having predefined characteristics;

estimating the converted signal to provide an output signal representing an estimate data block having a predefined number of bits;

detecting and correcting errors in the estimated data block and further including the step of encoding the data block with the predefined characteristics to provided a target channel signal that is an estimate of the converted signal; and providing an error signal by comparing the target channel signal with the converted signal.

9. The method according to claim 8 wherein the step of detecting and correcting errors comprises:

detecting a number of symbols in an error event in each data block from the error signal; and detecting the location of a symbol in error in each data block from the error signal.

10. The method according to claim 9 wherein the step of correcting error comprises:

repairing each symbol in error at the detected location in the output signal.

11. The method according to claim 10 wherein each block includes at least one error check symbol that provides a predefined number of symbols representing a first logic state, the step of detecting and correcting errors further includes:

providing a second error signal representing an error in each data block of a number of symbols representing the first logic state.

12. The method according to claim 11 wherein the step of correcting errors further includes:

combining the error signal with the second error signal to provide a max error signal from the combination of the error signal with the second error signal;

detecting the number of symbols in error in each data block from the max error signal; and detecting the location of the number of symbols in the error event in each data block from the max error signal.

13. The method according to claim 11 further comprising the steps of:

detecting errors at a boundary between a first data block and a second data block.

14. A data receiving channel for converting a coded data signal into a digital signal and wherein the coded data signal includes a predetermined number of symbols arranged into sequential blocks and each block is encoded with predefined characteristics comprising:

a signal converter circuit arranged to receive an input signal and to convert the input signal into a converted signal;

a Viterbi decoder circuit operatively connected to receive the converted signal, the Viterbi decoder circuit including an estimating circuit that provides a partial-response maximum likelihood signal of data blocks with each data block having a predefined number of symbols;

an error correction circuit including a target channel filter connected to encode the partial-response maximum likelihood signal with the predefined characteristics to provide a target channel signal that is an estimate of the converted signal, and a comparator that receives the target channel signal and the converted signal as inputs and compares the target channel signal with the converted signal to provide an error signal.

15. The data recovering channel according to claim 14 wherein the error correction circuit further comprises:

a maximum error detection circuit including a memory connected to store the error signal, a multiplexer having a first input connected to read the stored error signal in the memory and a second input connected to receive the error signal, a comparator having as an output a control signal connected to control the multiplexer and a first input connected to read the stored error signal and a second input connected to receive the error signal; and a location detection circuit including: a counter connected to count a number of symbols in the error signal, a second multiplexer having a first input connected to receive the count from the counter, a second input connected to an output from a register and a control input connected to receive the control signal, whereby the register stores the count in response to the control signal.

16. The data receiving channel according to claim 15 wherein the error correction circuit further comprises:

a repair circuit including a second register connected to receive as an input the sampled converted signal, and having at least one output and wherein for each output there is an exclusive OR circuit for providing the data signal from the exclusive OR of the output of the register and the output of the second register.

17. The data receiving channel according to claim 15 wherein each block of the coded signal includes at least one error check symbol that provides a predefined number of a first type of symbols representing a first logic state, the error correction circuit further includes:

a valid block detection circuit that includes: a RDS counter connected to receive the partial-response maximum likelihood signal and to count the number of the first logic states in each block of the partial-response maximum likelihood signal and a comparator circuit having a first input connected to the count of the first logic state from the RDS counter and a second input biased at a predefined number and to provide as an output a second error signal.

18. The data receiving channel according to claim 17 wherein the error correction circuit further includes:

a programmable FIR filter having an input for receiving the error signal and a programming input for receiving the second error signal and an output that provides a max error signal from the combination of the error signal with the second error signal.

19. The data recovering channel according to claim 18 wherein the error correction circuit further comprises:

a maximum error detection circuit including a memory connected to store the max error signal, a multiplexer having a first input connected to read the stored error signal in the memory and a second input connected to receive the max error signal, a comparator having as an output a control signal connected to control the multiplexer and a first input connected to read the stored error signal and a second input connected to receive the max error signal; and a location detection circuit including: a counter connected to count a number of symbols in the error signal, a second multiplexer having a first input connected to receive the count from the counter, a second input connected to an output from a register and a control input connected to receive the control signal, the register being arranged to store the count in response to the control signal.

20. The data receiving channel according to claim 19 wherein the error correction circuit further comprises:

a repair circuit including: an AND gate having a first inverted input connected to receive the second error signal and a second input connected to received the output of the register to provide a gated output, a second register connected to receive as an input the partial-response maximum likelihood signal, and having at least one output and wherein for each output there is an exclusive OR circuit for providing the data signal from the exclusive OR of the gated output of the register and the output of the second register.

21. The data recovery channel according to claim 20 wherein the error correction circuit further comprises:

a boundary error detection circuit including a delay register for delaying the second error signal by a first delay period, a "0" detect circuit connected to receive the second error signal and to provide a first output, a second "0" detect circuit connected to receive the output of the delay register to provide a second output, and an AND gate connected to receive the first and second outputs whereby the output of the AND gate will indicate when the second error signal indicates errors separated by the first delay period.

* * * * *